(12) United States Patent
Yamamoto

(10) Patent No.: US 6,851,794 B2
(45) Date of Patent: Feb. 8, 2005

(54) REDUCTION OF DEPENDENCE OF COLOR APPEARANCE ON LIGHT SOURCE

(75) Inventor: Yuko Yamamoto, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/655,140

(22) Filed: Sep. 3, 2003

(65) Prior Publication Data
US 2004/0056925 A1 Mar. 25, 2004

Related U.S. Application Data

(63) Continuation of application No. 10/081,244, filed on Feb. 21, 2002, now Pat. No. 6,637,861.

(30) Foreign Application Priority Data

Feb. 23, 2001 (JP) .......................................... 2001-47776
May 14, 2001 (JP) ....................................... 2001-143616

(51) Int. Cl.$^7$ ........................... B41J 2/205; G06K 15/00
(52) U.S. Cl. ............................ 347/43; 347/15; 358/1.9; 358/3.23
(58) Field of Search ................................ 347/15, 43, 9; 358/520, 527, 518, 521, 510, 1.2, 3.23

(56) References Cited

U.S. PATENT DOCUMENTS 6,690,489 B1 * 2/2004 Jacob et al. .................. 358/1.9
6,783,203 B2 * 8/2004 Fujimori ....................... 347/15

* cited by examiner

Primary Examiner—Lamson Nguyen
(74) Attorney, Agent, or Firm—Martine & Penilla, LLP (57) ABSTRACT

A look up table LUT with specific gray reproduction characteristics is used for converting RGB image data to multi-tone data of ink colors. The gray reproduction characteristics of LUT are set such that the color difference ΔE of a gray color area with an arbitrary tone level in the L*a*b* color system is kept at about 4 or less, assuming that the results are observed under two different light sources, such as standard light D50 and standard light A, respectively.

2 Claims, 12 Drawing Sheets

Fig.1(A)

GRAY COLOR AREA REPRODUCED BY BLACK INK

● : black ink dot

Fig.1(B)

GRAY COLOR AREA REPRODUCED BY COMPOSITE BLACK

⊘ : cyan ink dot

⊗ : magenta ink dot

⊕ : yellow ink dot

Fig.2(A)
SPECTRAL DISTRIBUTION OF SUNLIGHT (standard light D50)
$P_{D50}(\lambda)$ Fig.2(B)
SPECTRAL DISTRIBUTION OF INCANDESCENT LAMP (standard light A)
$P_A(\lambda)$ Fig.2(C)
SPECTRAL REFLECTANCE OF GRAY AREA PRINTED WITH COMPOSITE BLACK
$R_{CB}(\lambda)$ Fig.2(D)
COLOR-MATCHING FUNCTIONS
$z(\lambda)$, $y(\lambda)$, $x(\lambda)$ tristimulus values X, Y, Z
$X = k \int P(\lambda) \cdot R(\lambda) \cdot x(\lambda) \, d\lambda$
$Y = k \int P(\lambda) \cdot R(\lambda) \cdot y(\lambda) \, d\lambda$
$Z = k \int P(\lambda) \cdot R(\lambda) \cdot z(\lambda) \, d\lambda$ $(X, Y, Z)_{D50}$ ⟷ large difference ⟷ $(X, Y, Z)_A$ Fig. 3(D) COLOR-MATCHING FUNCTIONS $(X, Y, Z)_{D50} \longleftrightarrow (X, Y, Z)_A$ small difference tristimulus values X, Y, Z
$X = k \int P(\lambda) \cdot R(\lambda) \cdot x(\lambda) \, d\lambda$
$Y = k \int P(\lambda) \cdot R(\lambda) \cdot y(\lambda) \, d\lambda$
$Z = k \int P(\lambda) \cdot R(\lambda) \cdot z(\lambda) \, d\lambda$ Fig. 3(C) SPECTRAL REFLECTANCE OF GRAY AREA PRINTED WITH BLACK INK ALONE $R_{BK}(\lambda)$ Fig. 3(A) SPECTRAL DISTRIBUTION OF SUNLIGHT (standard light D50)

$P_{D50}(\lambda)$

Fig. 3(B) SPECTRAL DISTRIBUTION OF INCANDESCENT LAMP (standard light A)

$P_A(\lambda)$

ΔE: color difference due to difference in spectral characteristics between standard light D50 and standard light A ● : patches used for actual gray color reproduction (threshold value δ of color difference ΔE is equal to 3)

TEST PATTERN EXAMPLE FOR
DETERMINING INK DUTY LIMIT
(without bleeding)

Fig.12(B)

TEST PATTERN EXAMPLE FOR
DETERMINING INK DUTY LIMIT
(with bleeding)

REDUCTION OF DEPENDENCE OF COLOR APPEARANCE ON LIGHT SOURCE

CROSS REFERENCE TO RELATED APPLICATION

This application is a continuation of U.S. application Ser. No. 10/081,244, filed on Feb. 21, 2002 U.S. Pat. No. 6,637,861, the disclosure of which is incorporated herein by reference.

BACKGROUND OF THE INVENTION

1. Field of the Invention

The present invention relates to a color printing technique featuring multiple ink types.

2. Description of the Related Art

Color ink-jet printers are currently used on a wide scale as computer output devices. A common color ink-jet printer features a black (K) ink and multiple types of primary color inks, each having a cyan (C), magenta (M), or yellow (Y) hue. Any color of a color image can be reproduced by these multiple ink types. In particular, a gray color can be reproduced using either a black ink alone or all three types of primary color inks (CMY). The gray color reproduced using the three types of primary color inks (CMY) is commonly referred to as "composite black."

So-called graininess (image irregularities) is used as an indicator for evaluating image quality. Image graininess is observed when ink dots form separately from each other. Consequently, image graininess is often a problem in comparatively bright image areas with a small number of ink dots.

Figure 1A:
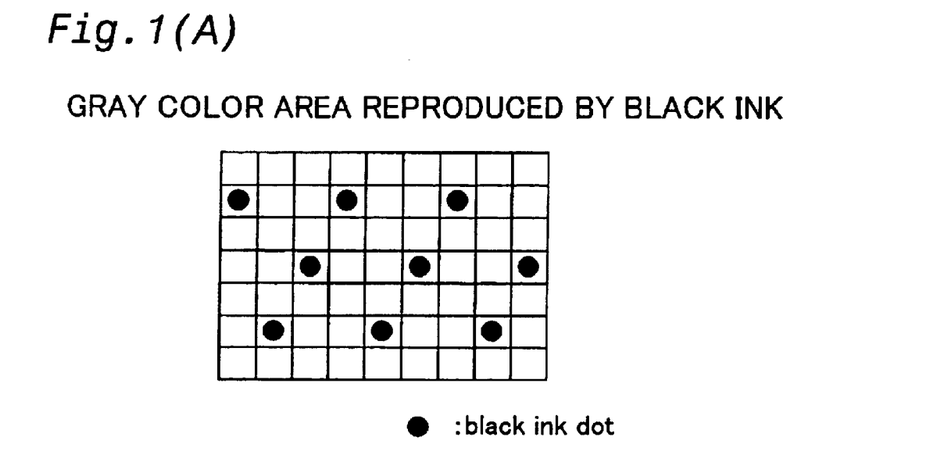
FIGS. 1(A) and 1(B) illustrate in enlarged form a gray color area reproduced by a black ink alone, and a gray color area reproduced by composite black.
Figure 1B:
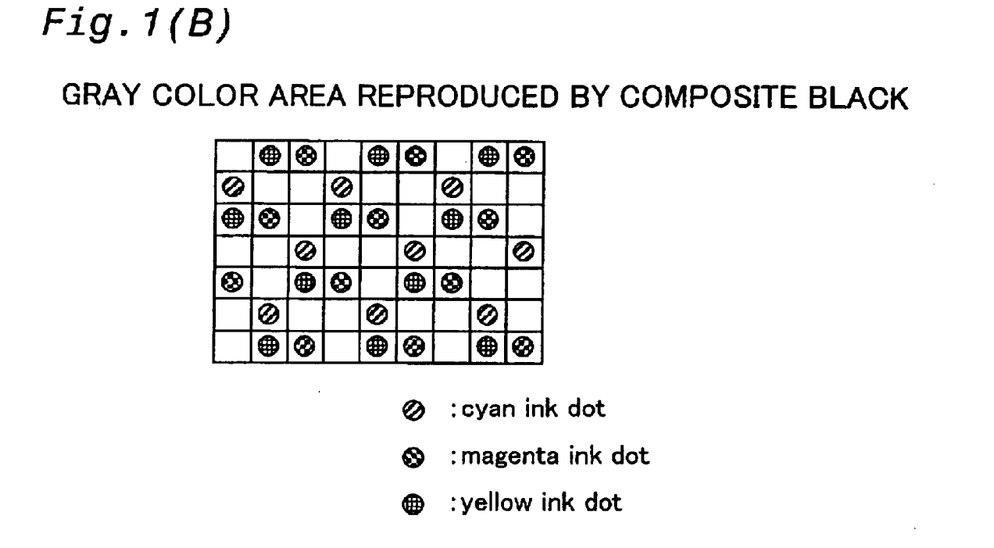

FIGS. 1(A) and 1(B) illustrate in enlarged form a gray color area reproduced by a black ink alone, and a gray color area reproduced by composite black. The examples shown indicate that when a gray color is reproduced using composite black, the number of ink dots is three times greater than when black ink alone is used. Image graininess commonly increases with a reduction in the number of ink dots. Consequently, gray colors should preferably be reproduced using composite black as much as possible because of considerations related to image graininess.

However, shades other than gray sometimes appear to be present in a gray color reproduced using composite black. This phenomenon is primarily attributed to the spectral characteristics of illuminating light, as described below.

Figure 2A:
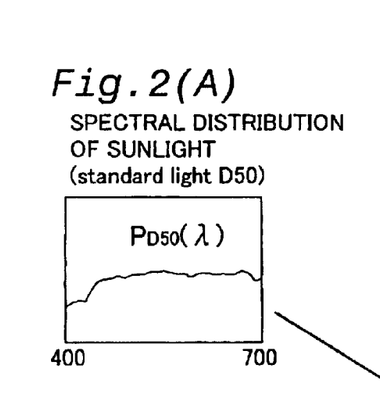
FIGS. 2(A)–2(D) illustrate the principle of color reproduction involving a gray color based on composite black.
Figure 2B:
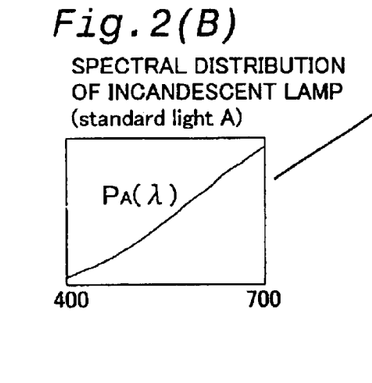
Figure 2C:
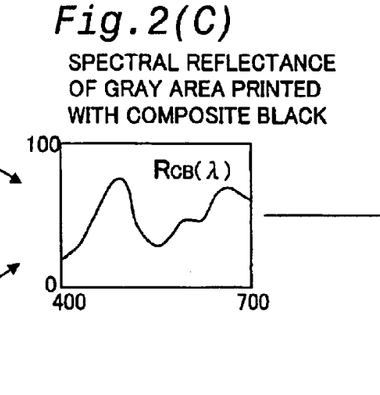
Figure 2D:
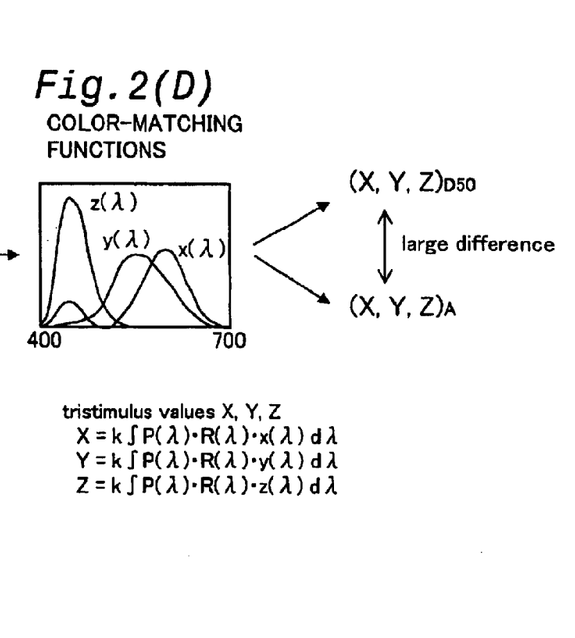

FIGS. 2(A)–2(D) illustrate the principle of color reproduction involving a gray color based on composite black. FIGS. 2(A) and 2(B) depict the spectral distribution $P_{D50}(\lambda)$ of sunlight and the spectral distribution $P_A(\lambda)$ of an incandescent lamp, respectively. FIG. 2(C) depicts the spectral reflectance $R_{CB}(\lambda)$ of a gray color reproduced using composite black, and FIG. 2(D) depicts the color-matching functions $x(\lambda)$, $y(\lambda)$, and $z(\lambda)$ of a CIE XYZ color system. As is well known, the tristimulus values X, Y, and Z for expressing the colors of an image area can be obtained by a method in which the product of the spectral distribution $P(\lambda)$ of illuminating light, the spectral reflectance $R(\lambda)$ of the image area, and the color-matching functions $x(\lambda)$, $y(\lambda)$, and $z(\lambda)$ is integrated over a visible range of wavelengths $\lambda$. In the present specification, the spectral distribution of standard light D50 (CIE) is used as the spectral distribution of sunlight. In addition, the spectral distribution of standard light A (CIE) is used as the spectral distribution of an incandescent lamp.

FIGS. 3(A)–3(D) illustrate the principle of color reproduction involving a gray color based on black ink alone. A comparison of FIGS. 2(C) and 3(C) indicates that the spectral reflectance $R_{CB}(\lambda)$ of composite black is comparatively irregular and that the spectral reflectance $R_{BK}(\lambda)$ of the black ink is comparatively smooth. The spectral reflectance of black ink and the spectral reflectance of composite black are noticeably different from each other but appear to have substantially the same color when viewed, for example, in sunlight (standard light D50). The phenomenon in which two colors with mutually different spectral characteristics appear to be substantially the same to the unaided eye under a light source is referred to as "metamerism."

Figures 3A, 3B, 3C:
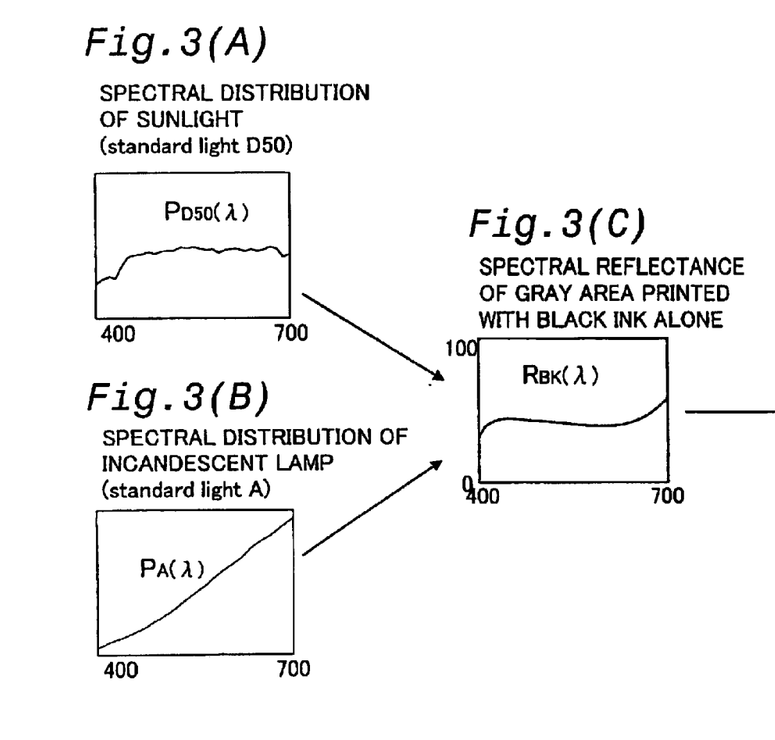
FIGS. 3(A)–3(D) illustrate the principle of color reproduction involving a gray color based on black ink alone.
Figure 3D:
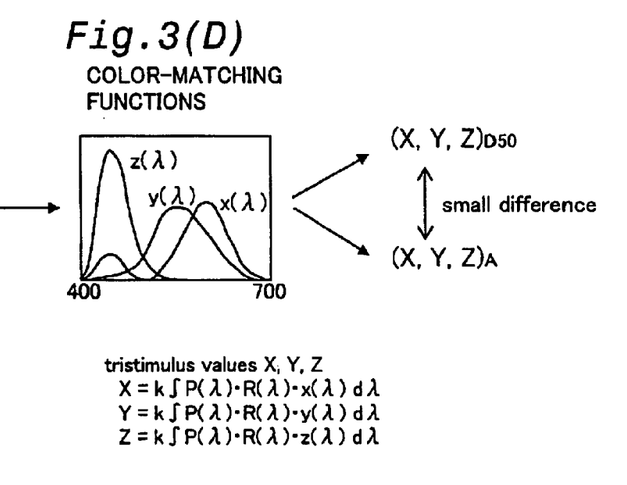

When viewed in illuminating light other than sunlight (for example, under an incandescent lamp), a gray color printed with composite black sometimes appears to contain colors other than gray. This is because a composite black and a black ink have markedly different spectral reflectance $R(\lambda)$. Specifically, the tristimulus values $(X, Y, Z)_{D50}$ obtained using the spectral distribution $P_{D50}(\lambda)$ of sunlight and the tristimulus values $(X, Y, Z)_A$ obtained using the spectral distribution $P_A(\lambda)$ of an incandescent lamp have comparatively large differences when composite black is involved. As a result, a gray color printed with composite black sometimes appears to contain shades or hues other than gray under an incandescent lamp. A black ink, on the other hand, has comparatively smooth spectral reflectance and comparatively similar tristimulus values $(X, Y, Z)_{D50}$ and $(X, Y, Z)_{DA}$. As a result, a gray color printed with black ink appears gray even when viewed under an incandescent lamp.

The dependence of the way in which a color is perceived by the unaided eye on the type of illuminating light (as in the case of composite black) is not a particularly desirable feature, creating a need for making a particular color look the same irrespective of the type of illuminating light. In other words, the appearance of a color should not depend on the type of light source used. Gray colors should preferably be reproduced by maximizing the use of black ink in order to reduce the dependence of color appearance on light sources.

In conventional practice, however, not much consideration is given to the dependence of color appearance on light sources during the reproduction of gray colors.

SUMMARY OF THE INVENTION

Accordingly an object of the present invention is to reduce dependence of color appearance of gray image areas on the light source used.

In order to attain at least part of the above and other related objects, there is provided a first method for printing images on a printing medium with the aid of a printing device capable of using multiple ink types. The printing method comprises the steps of: (a) preparing a black ink and multiple types of chromatic primary color inks, each of which has a cyan, magenta, or yellow hue; and (b) reproducing a gray color area having an arbitrary tone level using one or more types of ink selected from the black ink and the multiple types of chromatic primary color inks such that a color difference $\Delta E$ of the gray color area in an L*a*b* color system is kept at about 4 or less when the gray color area is observed under two different light sources, such as standard light D50 and standard light A, respectively.

This printing method can print images with reduced dependence of gray color appearance on the light source because the gray colors are reproduced at color difference $\Delta E$ of about 4 or less.

A second printing method of the present invention comprises comprising the steps of: (a) preparing a color conversion lookup table for converting first color image data expressed by a first color system to second color image data expressed by a second color system for the ink set; (b) converting the first color image data to the second color image data using the color conversion lookup table; (c) producing print data representing formation of ink dots at each pixel based on the second color image data; and (d) printing images in accordance with the print data. The color conversion lookup table has gray reproduction characteristics that allow a gray color area having an arbitrary tone level to be reproduced using one or more types of ink selected from the black ink and the multiple types of chromatic primary color inks such that a color difference ΔE of the gray color area in the L*a*b* color system is kept at about 4 or less when the gray color area is observed under two different light sources, such as standard light D50 and standard light A, respectively.

In a preferred embodiment, one type of gray color is selected from a first type of gray color obtained using the multiple types of chromatic primary color inks but not using the black ink, and a second type of gray color obtained using the black ink and the multiple types of chromatic primary color inks; and the gray color area is reproduced using the selected type of gray color.

This approach is not limited to reproducing gray colors with black ink alone and allows gray colors to be reproduced by a so-called composite black or a combination of a black ink and composite black. It is therefore possible to reproduce a gray color area in which balance is maintained between image graininess and the dependence of color appearance on the light source.

The multiple types of chromatic primary color inks may include a dark ink and a light ink with respect to cyan and magenta; and the gray color area may be reproduced using the light ink but not using the dark ink for the cyan and magenta when a lightness level of the gray color area falls within a range of about 70/255-255/255.

According to this approach, image graininess can be improved because using light inks rather than dark inks increases the number of ink dots.

The present invention is also directed to a method of preparing a color conversion lookup table for converting first color image data expressed by a first color system to second color image data expressed by a second color system for an ink set composed of a black ink and multiple types of chromatic primary color inks, each having a cyan, magenta, or yellow hue. The method comprises the steps of: (a) preparing a plurality of gray color patches having a plurality of gray tone levels, respectively, the plurality of gray color patches including a first type of gray color patch printed using the multiple types of chromatic primary color inks but not using the black ink, and a second type of gray color patch printed using the black ink and the multiple types of chromatic primary color inks; (b) selecting one of the plurality of gray color patches with respect to each gray tone level such that a color difference ΔE in the L*a*b* color system is kept at about 4 or less when the selected gray color patch is observed under different light sources, such as standard light D50 and standard light A, respectively; and (c) defining input and output of the color conversion lookup table to reproduce the gray color patch selected at each gray tone level.

In another aspect of the present invention, a gray color area is reproduced using both the black ink and the multiple types of chromatic primary color inks when the gray color area has a lightness level of about 150/255 or less.

This approach makes it possible to reproduce a comparatively dark gray color area in which balance is maintained between image graininess and the dependence of color appearance on the light source because this gray color area is reproduced by the combined use of a black ink and so-called composite black.

According to still another aspect of the present invention, a printing method comprises the steps of: (a) preparing a plurality of color conversion lookup tables for converting first color image data expressed by a first color system to second color image data expressed by a second color system for the ink set, the plurality of color conversion lookup tables including a first color conversion lookup table with comparatively desirable characteristics of dependence of color appearance on a light source and a second color conversion lookup table with comparatively desirable characteristics of graininess; (b) selecting one color conversion lookup table from the plurality of color conversion lookup tables and converting the first color image data to the second color image data; (c) producing print data representing formation of ink dots at each pixel based on the second color image data; and (d) printing images in accordance with the print data.

According to this method, images can be printed by selectively using a first color conversion lookup table with a comparatively good non-dependence of color appearances on the light source, and a second color conversion lookup table with comparatively good image graininess, making it possible to obtain an image quality that is in line with user preferences or particular image applications.

The present invention can be embodied in a variety of ways, specific examples of which include a printing method and device, a color conversion method and device, a method and device for creating color conversion lookup tables, a computer program for performing the functions of this method or device, a storage medium that stores this computer program and can be read by a computer, and a data signal embodied in a carrier wave containing this computer program.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention will now be described in the following sequence.

A. Device Structure
B. Embodiments of Color Reproduction
C. Modified Examples

A. Device Structure

Figure 4:
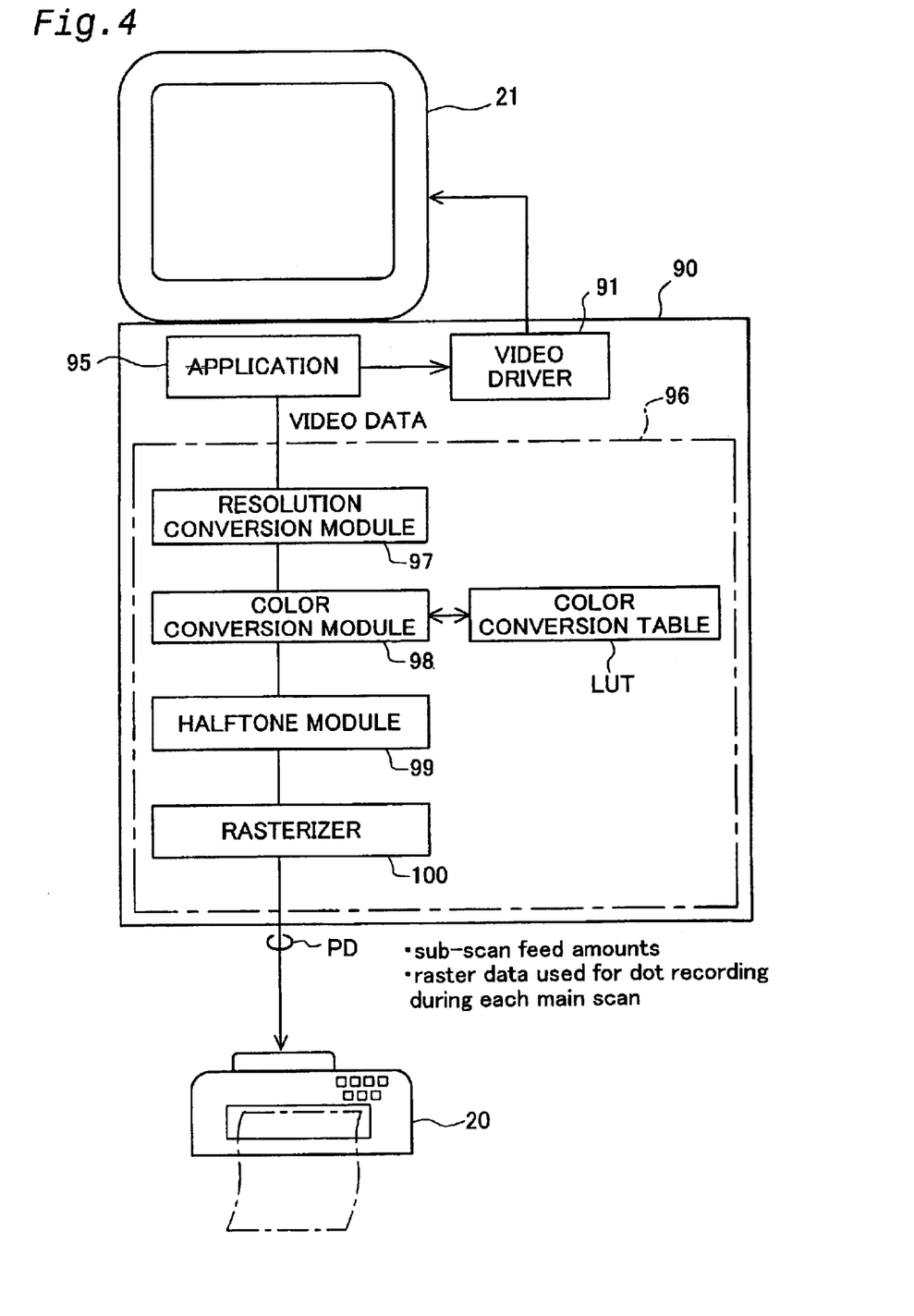
FIG. 4 is a block diagram depicting the structure of a printing system as an embodiment of the present invention.

FIG. 4 is a block diagram depicting the structure of a printing system as an embodiment of the present invention. The printing system comprises a computer 90 as a print control device, and a color printer 20 as a print unit. The color printer 20 and the computer 90 as a whole can be referred to as a printing device in the broad sense of the term.

In the computer 90, an application program 95 is executed within the framework of a specific operating system. The operating system contains a video driver 91 and a printer driver 96. The application program 95 outputs the print data PD to be transmitted to the color printer 20 via these drivers. The application program 95, which is used for image retouching and the like, processes an image and displays the image on a CRT 21 with the aid of a video driver 91.

When the application program 95 issues a print command, the printer driver 96 receives video data from the application program 95 and converts these data to the print data PD to be supplied to the color printer 20. In the example shown in FIG. 4, the printer driver 96 contains a resolution conversion module 97, a color conversion module 98, a halftone module 99, a rasterizer 100, and a color conversion lookup table LUT.

The resolution conversion module 97 operates such that the resolution of the color video data handled by the application program 95 (that is, the number of pixels per unit length) is converted to printing resolution. The video data whose resolution has been converted in this manner are still in the form of video information composed of the three color components RGB. The color correction module 98 converts the RGB (first color image data) data for each pixel into multi-tone data (second color image data) suitable for a plurality of ink colors and usable by the color printer 20 while the color conversion lookup table LUT is consulted.

The color-converted multi-tone data may, for example, have 256 gradation values. The halftone module 99 executes a so-called halftone routine and generated halftone image data. The halftone image data are rearranged by the rasterizer 100 according to the sequence in which the data are to be sent to the color printer 20, and are outputted as final print data PD. The print data PD comprise raster data for specifying the manner in which dots are recorded during each main scan, and data for specifying the sub-scan feed amounts.

The printer driver 96 is a program for performing functions to generate the print data PD. The program for performing the functions of the printer driver 96 can be stored on a computer-readable storage medium. Examples of such storage media include floppy disks, CD-ROMs, magneto-optical disks, IC cards, ROM cartridges, punch cards, printed matter with bar codes and other printed symbols, internal computer storage devices (RAM, ROM, and other types of memory), external storage devices, and various other computer-readable media.

Figure 5:
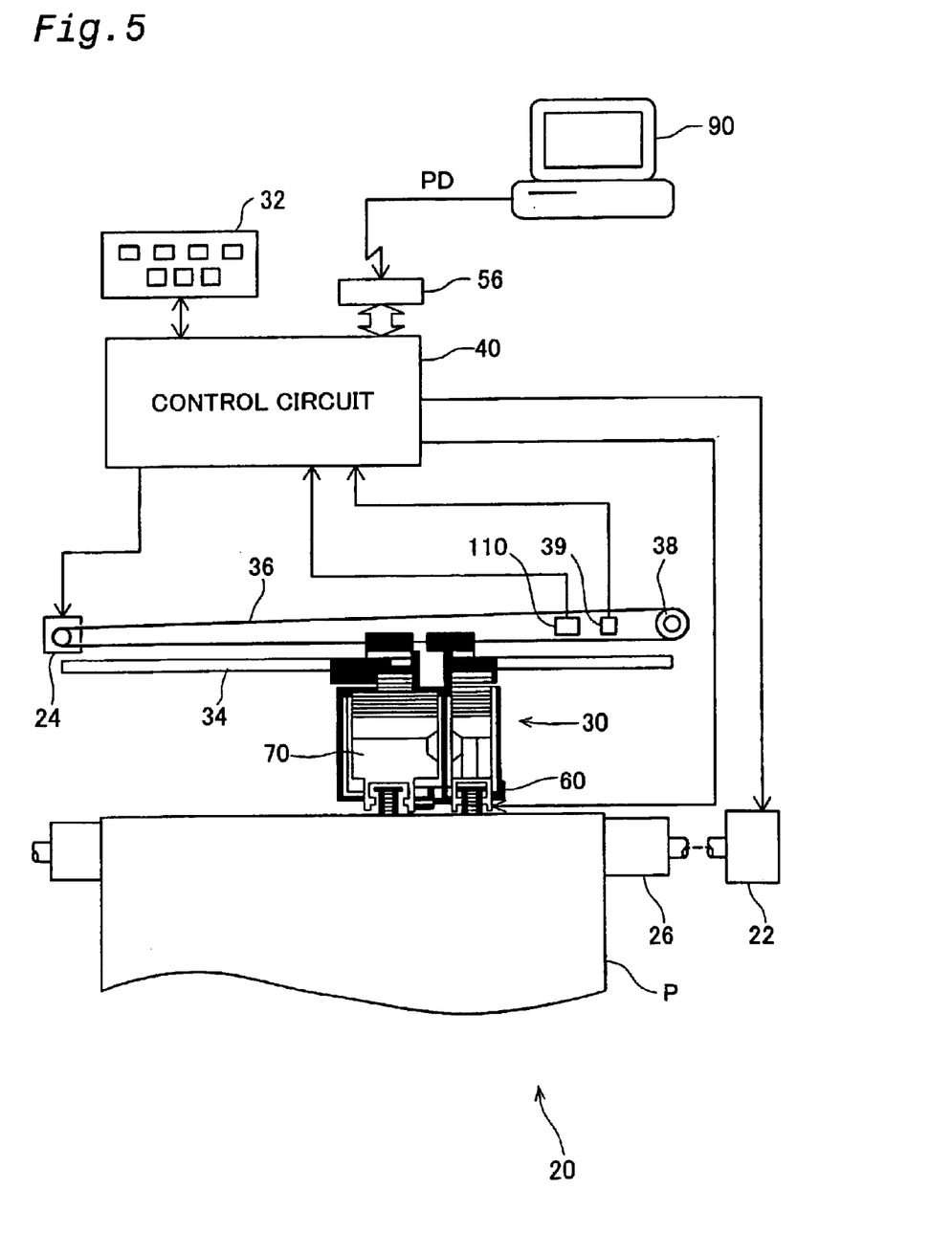
FIG. 5 is a diagram illustrating a printer structure.

FIG. 5 is a schematic structural drawing of the printer 20. The printer 20 comprises a sub-scanning mechanism for transporting printing paper P in the direction of sub-scanning with the aid of a paper feed motor 22; a main scanning mechanism for reciprocating a carriage 30 in the axial direction (direction of main scanning) of a platen 26 with the aid of a carriage motor 24; a head drive mechanism for actuating a print head unit 60 mounted on the carriage 30 and controlling ink ejection and dot formation; and a control circuit 40 for exchanging signals between the paper feed motor 22, the carriage motor 24, the print head unit 60, and a control panel 32. The control circuit 40 is connected to the computer 90 by a connector 56.

The sub-scanning mechanism for transporting the printing paper P is provided with a gear train (not shown) for transmitting the rotation of the paper feed motor 22 to the platen 26 and a paper feed roller (not shown). The main scanning mechanism for reciprocating the carriage 30 comprises a sliding shaft 34 mounted parallel to the axis of the platen 26 and designed to slidably support the carriage 30, a pulley 38 for extending an endless drive belt 36 from the carriage motor 24, and a position sensor 39 for sensing the original position of the carriage 30.

Figure 6:
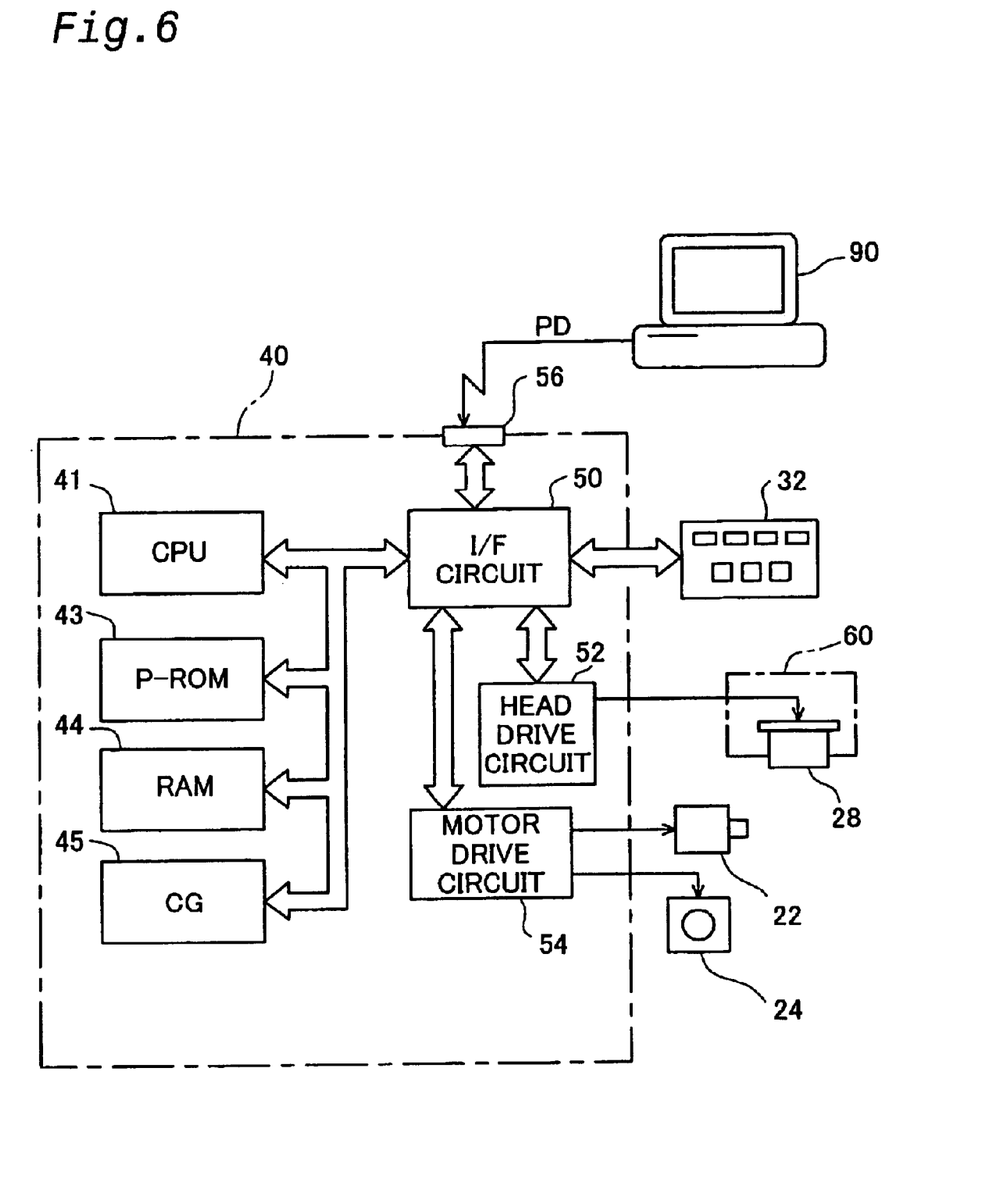
FIG. 6 is a block diagram depicting the structure of the control circuit 40 in the printer 20.

FIG. 6 is a block diagram depicting the structure of a printer 20 based on the control circuit 40. The control circuit 40 comprises a CPU 41, a programmable ROM (PROM) 43, a RAM 44, and a character generator (CG) 45 containing dot matrices for characters. The control circuit 40 further comprises an I/F circuit 50 for creating an interface with external motors, a head drive circuit 52 connected to the I/F circuit 50 and designed to eject ink by actuating the print head unit 60, and a motor drive circuit 54 for actuating the paper feed motor 22 and carriage motor 24. The I/F circuit 50 contains a parallel interface circuit and is capable of receiving the print data PD from the computer 90 via the connector 56. The printer 20 prints images in accordance with the print data PD. RAM 44 functions as a buffer memory for the temporary storage of raster data.

The print head unit 60 has a print head 28 and can support an ink tank. The print head unit 60 can be mounted on the printer 20 and removed therefrom as a single component. In other words, the print head unit 60 is replaced when the print head 28 needs to be replaced.

Figure 7:
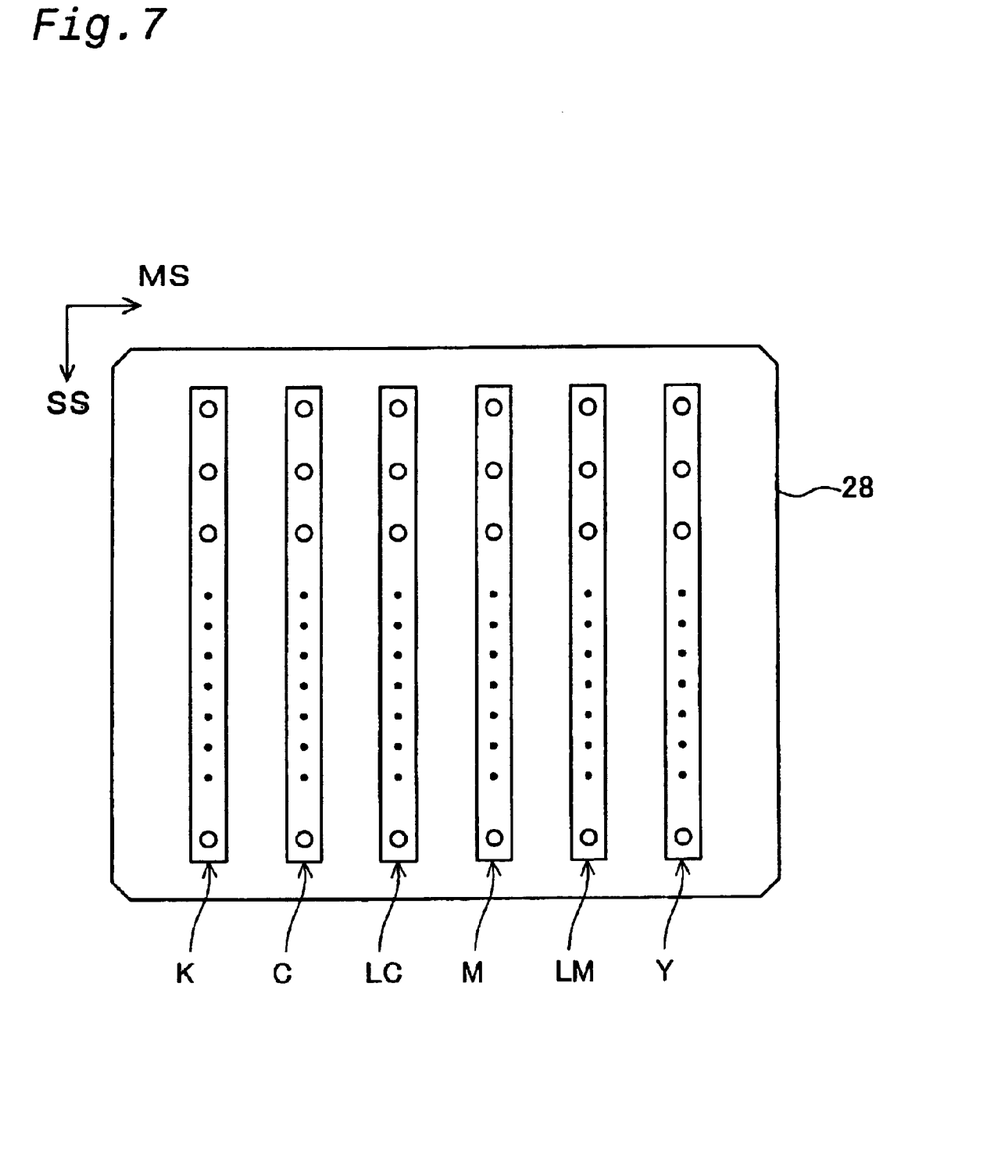
FIG. 7 is a diagram depicting the arrangement of nozzles on the bottom surface of the print head 28.

FIG. 7 is a diagram depicting the arrangement of nozzles on the bottom surface of the print head 28. The bottom surface of the print head 28 is provided with a nozzle array for ejecting a black ink K, a nozzle array for ejecting a dark cyan ink C, a nozzle array for ejecting a light cyan ink LC, a nozzle array for ejecting a dark magenta ink M, a nozzle array for ejecting a light magenta ink LM, and a nozzle array for ejecting a yellow ink Y.

According to this embodiment, the dark cyan ink C, dark magenta ink M, and yellow ink Y reproduce a black (composite black) by being mixed in substantially equal amounts. In other words, composite black can be reproduced by forming substantially equal numbers of dots with the dark cyan ink C, dark magenta ink M, and yellow ink Y. The light cyan ink LC and light magenta ink LM have a density that is 2/5 that of the dark cyan ink C and dark magenta ink M, respectively. A composite black can therefore be obtained by forming dots from the light cyan ink LC, light magenta ink LM, and yellow ink Y in a ratio of 5:5:2.

As used herein, the term "cyan primary color ink" refers to an ink containing both the dark cyan ink C and light cyan ink LC. Similarly, the term "magenta primary color ink" refers to an ink containing both the dark magenta ink M and the light magenta ink LM. In addition, the term "chromatic primary color ink having a cyan, magenta, or yellow hue" includes any ink that has one of the three hues and a density that is different from the densities of the other inks.

The printer 20 whose hardware is configured in this manner operates such that the carriage 30 is reciprocated by the carriage motor 24 during the transporting of the paper P by the paper feed motor 22, the piezoelements of the print head 28 are actuated at the same time, and ink drops of each color are ejected to form ink dots and multicolored grayscale images on the paper P.

B. Embodiment of Color Reproduction

Figure 8:
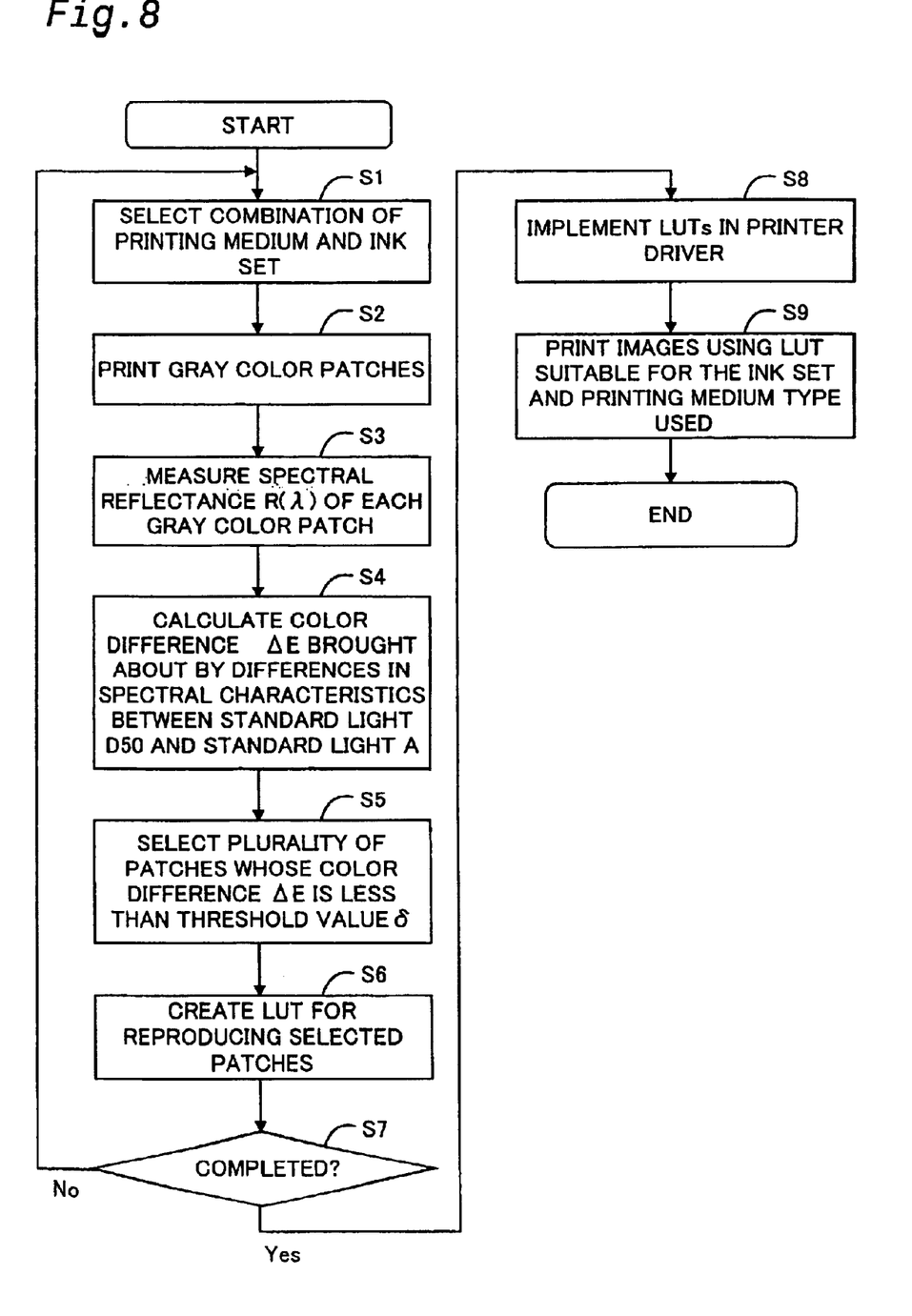
FIG. 8 is a flowchart depicting the color reproduction procedure according to an embodiment.

FIG. 8 is a flowchart depicting the color reproduction procedure according to an embodiment. Performing steps S1–S7 entails creating a color conversion lookup table LUT (FIG. 4) for reproducing gray colors in an appropriate manner.

First, performing step S1 entails selecting a combination of an ink set and a printing medium for printing. Common printers are designed for use with a single printing medium selected by the user from multiple types of printing media (plain paper, glossy paper, matted paper, and the like). There are also printers in which the desired ink set can be selected from multiple types of ink sets (such as dye ink sets and pigment ink sets). The spectral reflectance of printed matter depends on the spectral characteristics of the printing medium and the ink set used. In view of this, the present embodiment entails performing steps S2–S6 for each combination of printing media and ink sets and creating a color conversion lookup table LUT suitable for each combination. In common practice, the types of printing medium or ink sets envisaged for use with the printer 20 are displayed on a screen (not shown) for setting the printing conditions of the printer driver 96.

Figure 9:
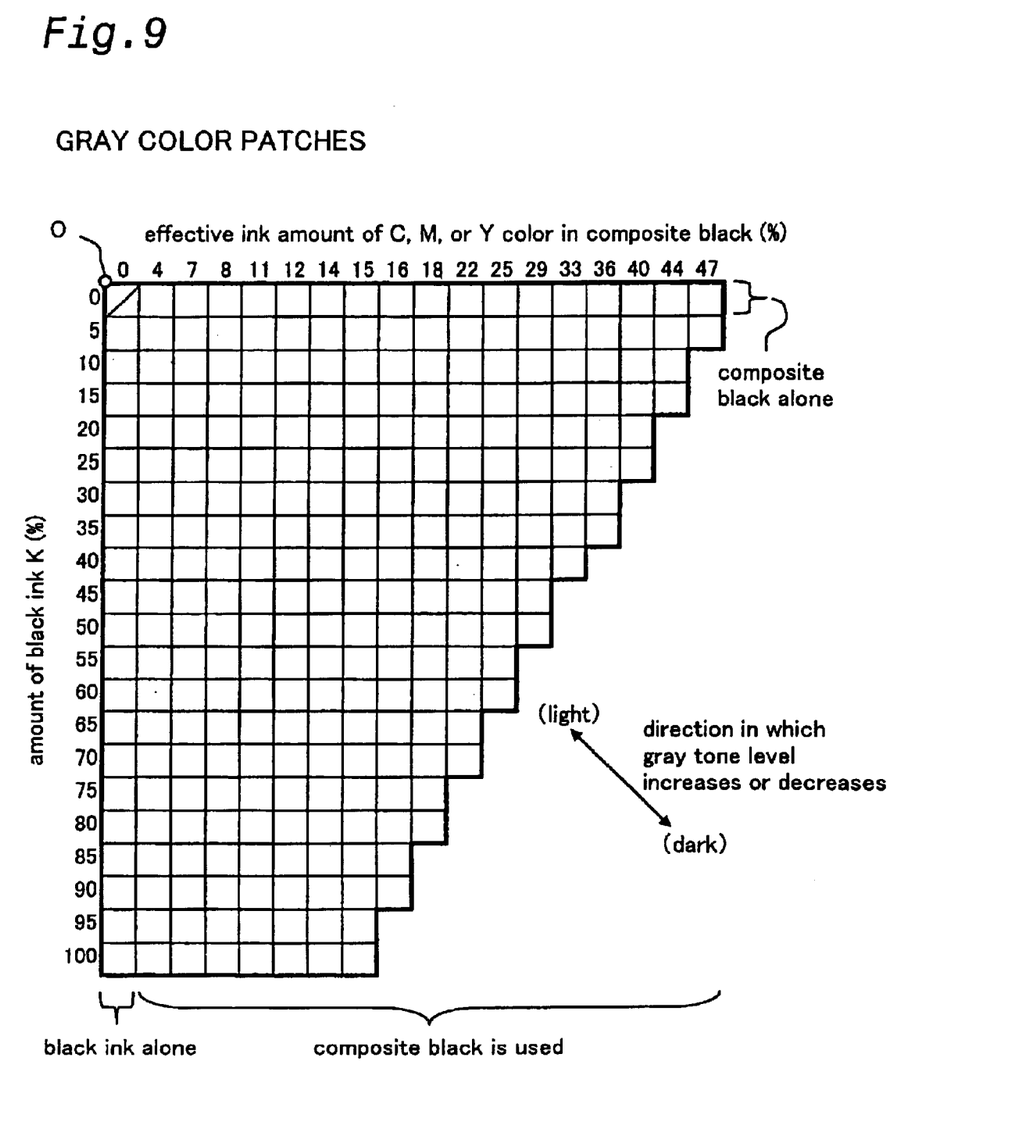
FIG. 9 is a diagram depicting the types of gray color patches created in accordance with the embodiment.

In step S2, multiple types of gray color patches are printed. FIG. 9 is a diagram depicting the types of gray color patches printed in accordance with the present embodiment. Origin O is placed in the upper left corner in FIG. 9, the amount (%) of black ink K is plotted on the vertical axis, and the effective ink amount (%) for each one of the colors CMY constituting the composite black is plotted on the horizontal axis. It is assumed herein that the amount of black ink K in a solid black image area is 100%. In addition, the term "effective ink amount of each one of the colors CMY" refers to the amount of ink corresponding to a single color in cases in which the composite black is obtained by mixing equal amounts of the dark cyan ink C, dark magenta ink M, and yellow ink Y. The fact that the effective ink amount of each one of the colors CMY is equal to 100% indicates that the inks with the three colors CMY are each ejected in an amount sufficient for creating a solid area having a single color. Another feature of the present embodiment is that the light cyan ink LC and light magenta ink LM have a density that is 2/5 that of the dark cyan ink C and dark magenta ink M. For example, 10% for the light cyan ink LC is considered to be equivalent to 4% for the dark cyan ink C. In addition, the actual ink amount resulting from the use of the light cyan ink LC is 5/2 of the effective ink amount. Ink amount is sometimes referred to as "dot recording rate" because it also represents the percentage of pixels at which ink dots are recorded.

A gray color patch is printed using ink amounts defined for each of the square positions shown in FIG. 9. The dark cyan ink C and dark magenta ink M are not used but a light cyan ink LC and light magenta ink LM are used when the effective ink amount of the composite black is relatively low (for example, when the effective ink amount is 12% or less). This is because a light ink needs to be consumed in a greater actual amount than does a dark ink in order to achieve the same effective ink amount, resulting in a larger number of ink dots. It is therefore preferable to use light inks in order to reduce image graininess. The amount of dark inks gradually increases and the amount of light inks gradually decreases with increased effective ink amount (for example, 14% or greater).

Gray color patches for which the effective ink amount of composite black is 0% are reproduced by the black ink K alone. Gray color patches for which the amount of black ink K is 0% are reproduced by the composite black alone. All other gray color patches are reproduced using inks having the four hues CMYK.

The density (gray tone level) of the gray color patches tends to increase with increased distance from the origin O. Consequently, a plurality of patches having substantially the same tone levels are present among the gray color patches shown as squares in FIG. 9. In view of this, patches considered desirable because of considerations related to image graininess and the dependence of color appearance on the light source may preferably be selected from gray color patches having various tone levels in the course of step S3 (FIG. 8) and subsequent stages.

In step S3, the spectral reflectance $R(\lambda)$ of each gray color patch is measured. Performing step S4 entails calculating the color difference $\Delta E$ between the color observed in standard light D50 and the color observed in standard light A for each of the gray color patches. According to a specific example, the tristimulus values $(X, Y, Z)_{D50}$ observed in standard light D50 and the tristimulus values $(X, Y, Z)_A$ observed in standard light A are calculated, as shown in FIGS. 2(A)–2(D) and 3(A)–3(D). The color difference $\Delta E$ of the L*a*b* color system is then calculated based on the tristimulus values $(X, Y, Z)_{D50}$ and tristimulus values $(X, Y, Z)_A$.

Figure 10:
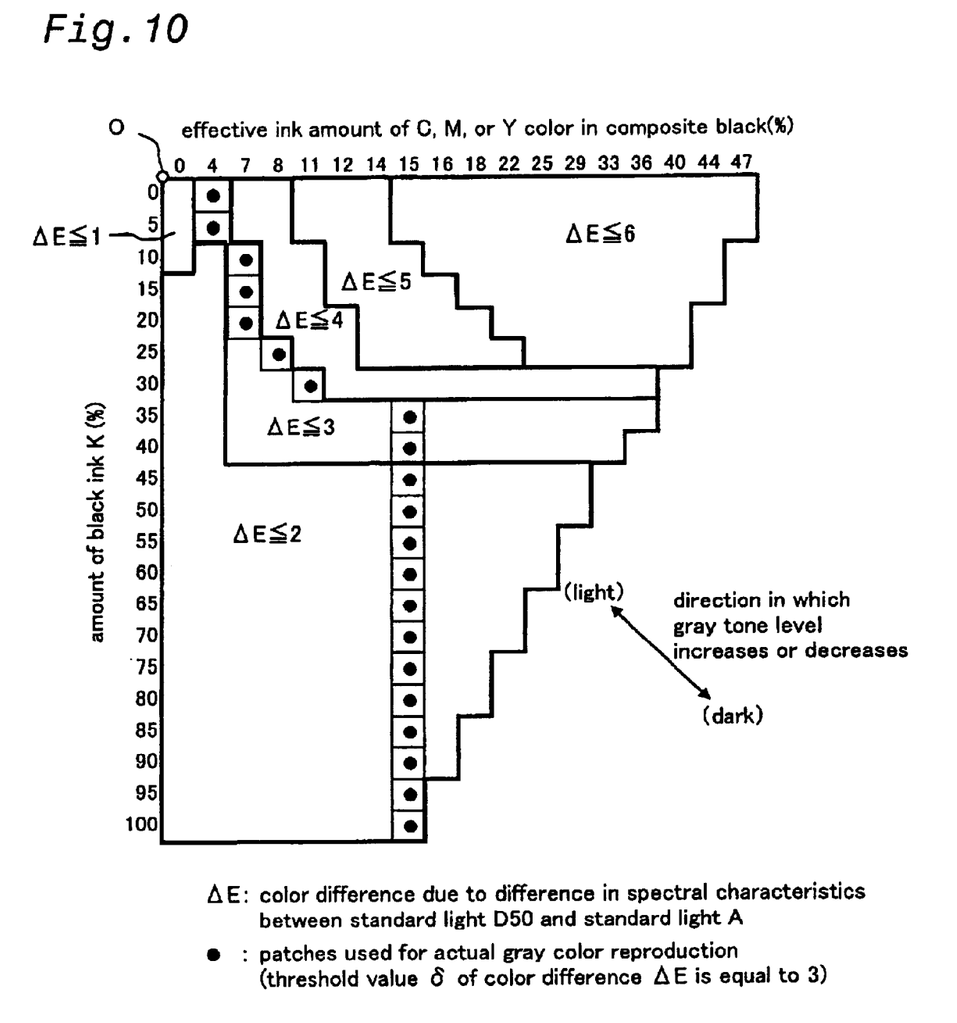
FIG. 10 is a diagram illustrating the manner in which the color difference ΔE of gray color patches is distributed.

FIG. 10 is a diagram illustrating the manner in which the color difference $\Delta E$ of gray color patches is distributed. In the example shown, the gray color patches are divided into a plurality of groups in accordance with the color difference $\Delta E$, and the borderlines between the groups are shown by thick lines. The color difference $\Delta E$ commonly tends to increase with an increase in the ink amount of composite black. A smaller color difference $\Delta E$ is preferred because it reduces the dependence of color appearance on the light source and the extent to which shades or hues other than gray are admixed. Considerations related to image graininess also suggest that the use of black ink K alone may be forgone and that composite black may preferably be used. In particular, the graininess of comparatively bright image areas can be improved further through the use of the light inks LC and LM instead of the dark inks C and M.

In step S6 (FIG. 8), a plurality of patches for reproducing gradations of gray color are selected from among the patches whose color difference $\Delta E$ is below a specific threshold value $\delta$. In FIG. 10, the positions of the gray color patches thus selected are shown by solid circles. In this example, the threshold value $\delta$ of the color difference $\Delta E$ is 3. Of the plurality of patches having the same gray tone level, those with the maximum ink amount of composite black are selected until the effective ink amount of each primary color in the composite black reaches 12% (to a total of 36%). This is done in order to improve the graininess and banding in highlighted areas (bright areas).

Any of a variety of other methods other than the method shown in FIG. 10 may also be used to select the gray color patches. For example, the threshold value $\delta$ of the color difference $\Delta E$ can be set to any level less than or equal to about 4. Setting the threshold value $\delta$ to 1 results in a very small number of selectable gray color patches and sometimes makes it difficult to reproduce gray shades from 0% to 100%. Consequently, the threshold value δ may preferably be set anywhere between about 2 and about 4. In addition, setting the threshold value δ to about 4 provides wide latitude for selecting the gray color patches, and is hence beneficial in terms of obtaining improved image graininess. In addition, setting the threshold value δ to about 2 is beneficial for reducing the dependence of color appearance on the light source.

Once a plurality of gray color patches for reproducing various gray tone levels have been selected in this manner, a color conversion lookup table LUT (FIG. 4) for reproducing the selected gray color patches is created in step S6 (FIG. 8). The color conversion lookup table LUT according to the present embodiment is designed for inputting RGB image data and outputting multi-tone image data for the six ink colors shown in FIG. 7. In view of this, gray tone levels associated with the values of the RGB image data are first calculated when the color conversion lookup table LUT is created. The amount in which each type of ink is consumed for the gray color patches needed to reproduce the gray tone levels is then determined based on the values of the patches selected in FIG. 10. The lookup table LUT is created by inputting the values of the RGB image data and outputting the amount of each type of ink. The inputs and outputs related to colors other than gray may also be determined by a method other than the one described above.

It is determined in step S7 (FIG. 8) whether the processing of steps S1–S6 has been completed for all the combinations of printing media and ink sets available for the printer 20. The processing of steps S1–S6 is repeated if not all of the processing steps have been completed, and the operation proceeds to the subsequent step S8 if the steps have been completed.

In step S8, the multiple types of color conversion lookup tables LUT thus created are incorporated into the printer driver 96 (FIG. 4). The printer driver 96 is a computer program that allows the computer 90 to execute functions involved in creating the print data PD supplied to the printer 20. The color conversion lookup table LUT is installed together with the printer driver 96 on the computer 90 as a type of data accessible by the printer driver 96. The printer driver 96 containing the color conversion lookup table LUT is commonly supplied by the manufacturer of the printer 20.

In step S9 (FIG. 8), the user prints images with the aid of the printer 20. In the process, the images are printed after the lookup table suited to a combination of the printing medium and the ink set used in actual printing is selected from the color conversion lookup tables LUT for all possible combinations of printing media and ink sets. The combination of a printing medium and an ink set for use in an actual printing operation is selected by the user on a screen (not shown) that allows printing conditions to be set for the printer driver 96.

Figure 11A:
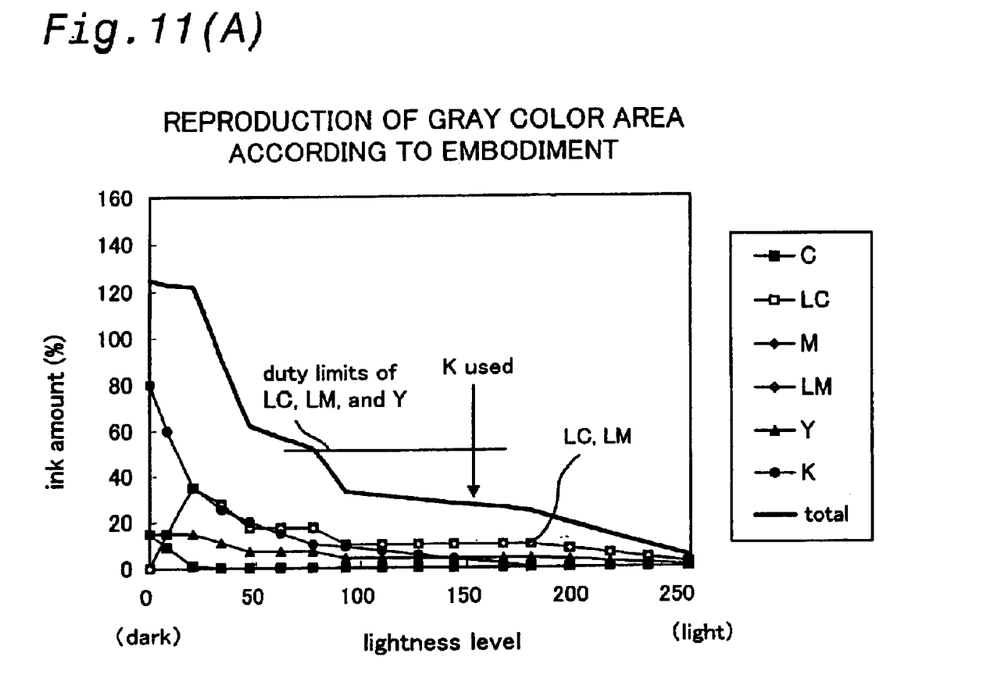
FIGS. 11(A) and 11(B) are graphs showing the ink consumption needed to reproduce the gray color areas according to the working and comparative examples.
Figure 11B:
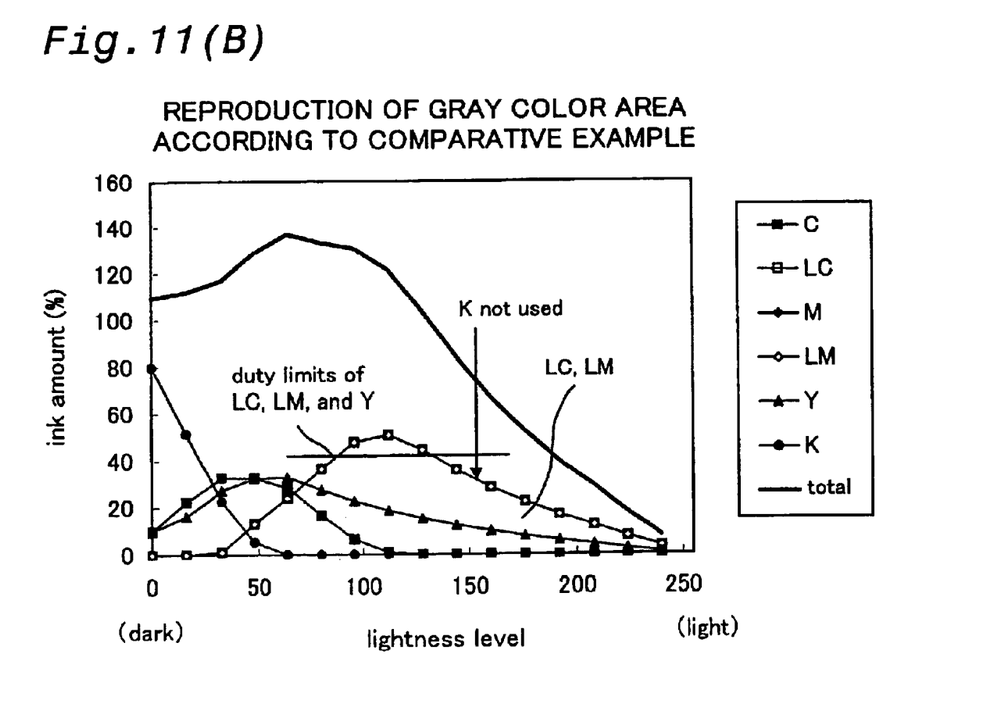

FIG. 11(A) depicts the amount of each type of ink for reproducing gray color areas with the aid of the color conversion lookup tables LUT created in accordance with the present embodiment. FIG. 11(B) depicts a comparative example. The lightness level, plotted on the horizontal axis, is defined within a range of 0–255. Ink amount (or dot recording rate) is plotted on the vertical axis. The term "dot recording rate" refers to the relative ink amount obtained on the assumption that a value of 100% is achieved when a solid area is printed with a single type of ink.

According to the comparative example, when the lightness is comparatively high, specifically, when the lightness level is 50/250 or greater, the black ink is not used and gray colors are reproduced solely with composite black obtained using LC, LM, and Y inks. By contrast, the present embodiment entails reproducing gray colors using both a black ink and composite black obtained using LC, LM, and Y inks even when the lightness is comparatively high. In addition, using composite black obtained by employing the light inks LC and LM yields less graininess than that envisaged when the dark inks C and M are used. By contrast, the comparative example produces better graininess in a high lightness area (light image area) than does the embodiment because composite black is used without any black ink.

According to the present embodiment, the density of the light inks LC and LM is only two fifth the density of the dark inks C and M, so the light inks LC and LM are consumed in an amount 5/2 times that of the dark inks C and M when the composite black is obtained using the LC, LM, and Y inks. Consequently, the light inks LC and LM are set to be consumed in an amount that is 5/2 times the amount of the yellow ink Y.

Another feature of the comparative example is that if the lightness level gradually decreases from 255, the amount of the LC and LM ink gradually increases and reaches the duty limit for composite black based on LC, LM, and Y inks when the lightness level assumes a value of about 120. As used herein, the term "duty limit" refers to the maximum ink amount allowed from the standpoint of ink bleeding. More specifically, the duty limit of an ink combination is defined as the amount at which no bleeding occurs when images are printed using this ink combination.

Figure 12A:
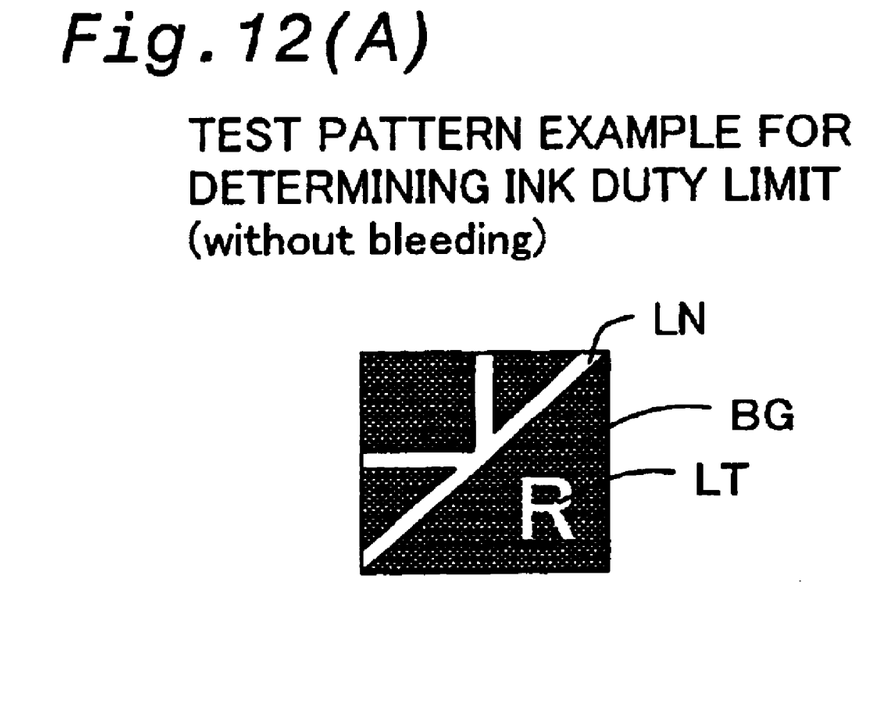
FIGS. 12(A) and 12(B) illustrate an example of a test pattern used to determine the duty limit of an ink combination.
Figure 12B:
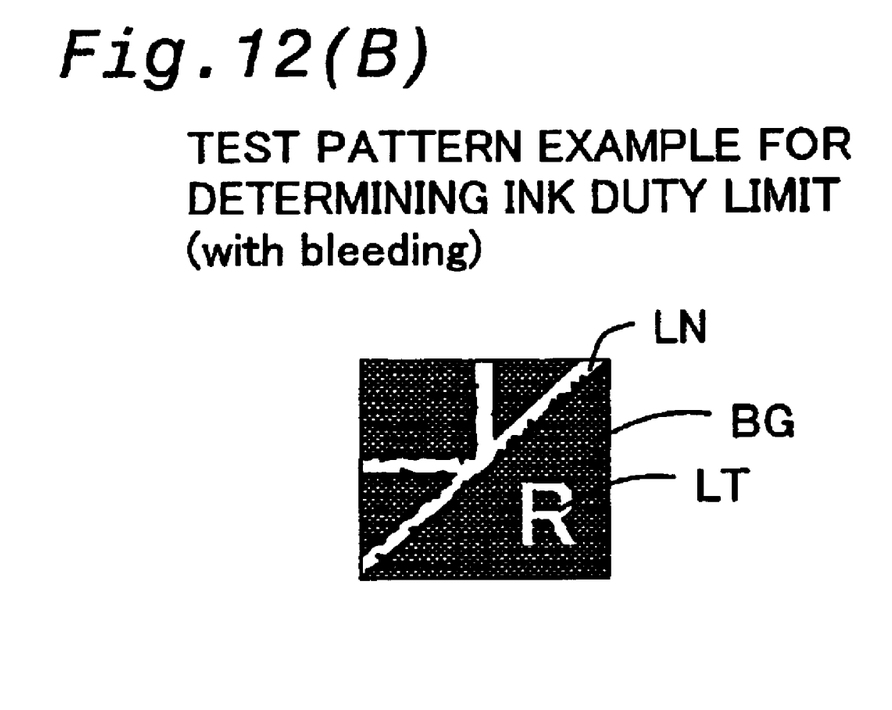

FIGS. 12(A) and 12(B) depict printed test patterns used to determine the duty limit of an ink combination. The test pattern comprises a background area BG, a linear portion LN, and a letter portion LT. For example, the background area BG may be printed using composite black produced by LC, LM, and Y inks. The linear portion LN and letter portion LT may be printed in a variety of other colors and densities. The combined ink amount of the linear portion LN and letter portion LT is commonly set to the same level as that of the background area BG. FIG. 12(A) depicts a bleeding-free case, and FIG. 12(B) depicts a case in which some bleeding is observed along the border between the background area BG and the linear portion LN. Such test patterns can be printed using various types of inks. The maximum amount in which an ink can be consumed without producing bleeding is defined as the duty limit of this ink.

According to the comparative example shown in FIG. 11(B), the amounts of light inks LC and LM are increased up to the duty limit of composite black (LC, LM, Y) determined as described above. By contrast, the embodiment shown in FIG. 11(A) is such that the light inks LC and LM are consumed in amounts that are markedly less than the duty limit. The reason for this is that the dependence of color appearance on the light source can be improved by the efficient use of the black ink K rather than the exclusive use of composite black even when the lightness is comparatively high. Specifically, the present embodiment allows the consumption of the inks LC, LM, and Y that make up composite black to be reduced by the use of a black ink K even when a gray color can be reproduced solely with the aid of the composite black within the ink duty limits.

In more specific terms, the present embodiment allows black ink K to be used when the lightness level is at about 150/255, whereas in the comparative example the use of the black ink K can be started only when the lightness level has decreased to about 50/255. These examples demonstrate that a comparatively dark gray color with a lightness level of about 150/255 or less may preferably be reproduced using both a black ink K and composite black in order to improve the dependence of colors on the light source.

Thus, the present embodiment allows the manner in which a gray color having an arbitrary tone level depends on the light source can be improved because the gray color is reproduced such that the color difference ΔE of the color in two types of standard light (D50 and A) is below a specific threshold value δ. It is also possible to reproduce gray color areas of low image graininess because gray colors having comparatively high brightness and tone levels can be reproduced using both a black ink K and composite black.

C. MODIFIED EXAMPLES

C1. Modified Example 1

Although the above embodiment is configured such that a composite black is created using a light cyan ink LC and a light magenta ink LM it is also possible to adopt an arrangement in which the composite black is created using a dark cyan ink C and a dark magenta ink M. Image graininess can be improved by the use of the light inks LC and LM without the use of the dark inks C and M when the lightness level is comparatively high. Specifically, it is preferable that the dark inks C and M are not used and the light inks LC and LM may be used when the lightness level ranges from about 70/255 to 255/255, and the use of the light inks LC and LM is particularly preferred in the range of about 50/255 and 255/255.

C2. Modified Example 2

Although the above embodiment is described with reference solely to a method for reproducing gray colors, the present invention may also be adapted to cases in which gray components are needed during the reproduction of colors other than gray. In other words, both a black ink and composite black can be used as the gray components of an arbitrary color. In this case, the combined use of the black ink and composite black may also be restricted to a specific color reproduction range in the vicinity of a gray color. Specifically, it is possible, for example, to limit the combined use of black ink and composite black to colors disposed at a given distance from the L* axis of the L*a*b* color system, and to use composite black alone for all other colors. This is because the human eye is comparatively insensitive to the dependence of color appearance on the light source (metamerism) for colors other than gray, making it more beneficial to concentrate on graininess rather than on the dependence of color appearance on the light source.

C3. Modified Example 3

The above embodiment is described with reference to a case in which gray color patches are classified into three groups: those reproducible with black ink alone, those reproducible with composite black alone, and those reproducible by mixtures of black ink and composite black, as shown in FIG. 9. However, it is unnecessary to print the gray color patches with black ink alone when the gray color cannot be reproduced by the black ink alone by the actual printer.

C4. Modified Example 4

Although the above embodiment is described with reference to a case in which a color conversion lookup table LUT is used to input RGB data and to output multi-tone data for a plurality of inks, it is also possible to adopt an arrangement in which a color system (for example, an XYZ color system or an L*a*b* color system) other than an RGB color system is used as the color system for inputting data into the lookup table LUT.

Although the above embodiment is described with reference to a case in which the ink set of the printer 20 contained six types of ink, it is also possible to adopt any other arrangement for the ink set. The color conversion lookup table LUT is designed to output the multi-tone data (second color image data) for the plurality of ink types contained in the ink set actually used by the printer 20.

C5. Modified Example 5

Performing the above embodiment entailed creating a color conversion lookup table LUT by taking into account the balance between image graininess and the dependence of color appearance on the light source for all possible combinations of multiple types of ink sets and multiple types of printing media available for the printer 20. Alternatively, the color conversion lookup table LUT created with consideration for the balance between image graininess and the dependence of color appearance on the light source may also be compiled only for some of these multiple combinations. Specifically, the lookup table LUT for a transparent printing medium (OHP or the like) may be created without any regard for the dependence of color appearance on the light source. In this case, fairly dark gray colors may be reproduced by composite black alone, as in the comparative example shown in FIG. 11(B).

In addition, the balance between image graininess and the dependence of color appearance on the light source may be taken into account only for some printing resolutions when the printer 20 can print images with a plurality of printing resolutions. Maintaining a balance between image graininess and the dependence of color appearance on the light source is required particularly often for a print mode having high image quality, which commonly has high printing resolution. Consequently, a gray color can be successfully reproduced by taking into account the balance between image graininess and the dependence of color appearance on the light source in at least one mode with a comparatively high printing resolution.

For at least one print mode of the printer 20, the user makes an arbitrary selection from among a plurality of tables containing at least a first color conversion lookup table characterized by comparatively desirable characteristics of dependence of color appearance on the light source, and a second color conversion lookup table characterized by comparatively desirable characteristics of image graininess. For example, the color reproduction arrangement shown in FIG. 11(A) can be used as a first color conversion lookup table, and the color reproduction arrangement shown in FIG. 11(B) can be used as a second color conversion lookup table. In this case, it is possible, for example, to adopt an arrangement in which a color conversion lookup table characterized by excellent graininess is used as the default (initial setting), and another color conversion lookup table characterized by an excellent non-dependence of color appearance on the light source can be selected by the user from a screen that contains detailed settings for the printing conditions of the printer driver. Adopting this approach makes it possible to obtain the optimum image quality (graininess or dependence of color appearance on the light source) in line with user preferences or particular image applications.

C6. Modified Example 6

Although the above embodiment is described with reference to cases in which images are printed using a color conversion lookup table LUT, the present invention can also be adapted to a printing method or device operated without the use of such color conversion lookup tables.

C7. Modified Example 7

The present invention can also be adapted to a drum-scan type printer. This would entail adapting the present invention not only to a so-called ink-jet printer but also to any other common printing device capable of printing color images by ejecting ink from a print head. Examples of such printing devices include facsimile machines and copying machines.

C8. Modified Example 8

Some of the hardware functions in the above embodiment can be performed by software, or, conversely, some of the software functions can be performed by hardware. For example, some of the functions of the printer driver 96 (FIG. 4) can be performed by the control circuit 40 in the printer 20 (FIG. 6).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of printing images on a printing medium with the aid of a printing device capable of using an ink set containing a black ink and multiple types of chromatic primary color inks, each of which has a cyan, magenta, or yellow hue, comprising the steps of:

(a) preparing a plurality of color conversion lookup tables for converting first color image data expressed by a first color system to second color image data expressed by a second color system for the ink set, the plurality of color conversion lookup tables including a first color conversion lookup table with comparatively desirable characteristics of dependence of color appearance on a light source and a second color conversion lookup table with comparatively desirable characteristics of graininess;

(b) selecting one color conversion lookup table from the plurality of color conversion lookup tables and converting the first color image data to the second color image data;

(c) producing print data representing formation of ink dots at each pixel based on the second color image data; and (d) printing images in accordance with the print data.

2. A printing device for printing images on a printing medium, comprising:

a print head capable of jetting ink drops of a black ink and multiple types of chromatic primary color inks, each of which has a cyan, magenta, or yellow hue;

a plurality of color conversion lookup tables usable to convert first color image data expressed by a first color system to second color image data expressed by a second color system for the ink set, the plurality of color conversion lookup tables including a first color conversion lookup table with comparatively desirable characteristics of dependence of color appearance on a light source and a second color conversion lookup table with comparatively desirable characteristics of graininess;

a color converter configured to select one color conversion lookup table from the plurality of color conversion lookup tables and convert the first color image data to the second color image data;

a print data generator configured to produce print data representing formation of ink dots at each pixel based on the second color image data; and a head driver configured to drive the print head to jet ink drops in accordance with the print data.

* * * * *